Nov. 3, 1925.

G. P. B. HOYT ET AL

CARBURETOR

Filed Dec. 31, 1921.

1,560,238

Inventors,
Gabriel T. B. Hoyt, and
David B. Carse,
By Offield, Poole, Hinton & Scott Attys.

Patented Nov. 3, 1925.

1,560,238

UNITED STATES PATENT OFFICE.

GABRIEL P. B. HOYT, OF JAMAICA, NEW YORK, AND DAVID B. CARSE, OF SHARON, CONNECTICUT.

CARBURETOR.

Application filed December 31, 1921. Serial No. 526,194.

*To all whom it may concern:*

Be it known that we, GABRIEL P. B. HOYT, a citizen of the United States, and a resident of Jamaica, in the county of Queens and State of New York, and DAVID B. CARSE, a citizen of the United States, and a resident of Sharon, in the county of Litchfield and State of Connecticut, have invented certain new and useful Improvements in Carburetors, of which the following is a specification.

This invention relates to improvements in carburetors and more particularly to devices employed with internal combustion engines for mixing air with a liquid hydrocarbon fuel in the proper proportion for forming the explosive mixture.

The carburetor of the type to which the present invention relates is characterized by the maintenance of a constant supply of the liquid hydrocarbon, with a variable air supply, adjustable to meet the normal operating conditions of the motor, and furthermore by the bringing of the air and liquid fuel into contact in such a manner as to automatically control the quality of the mixture to the speed of the motor.

It is a well recognized fact in carburetor practice, that at different motor speeds the correspondingly varying suction produced at the intake opening, causes a varying proportion of air and liquid in the mixture to be drawn into the intake manifold, the ratio of the liquid to air increasing as the speed is increased. The result of this action is the production of a richer mixture at high motor speeds, whereas efficient operating conditions demand a thinner or lean mixture at high speeds.

The object of the present invention is therefore to provide a carburetor which will automatically adjust itself to motor speeds varying the richness of the mixture inversely as the speed of the motor is varied.

A further object of the invention is to incorporate in a device of the character described means for preheating the liquid fuel prior to its mixture with the air, thereby rendering it more volatile and facilitating its more rapid absorption by the air.

A device embodying the invention is clearly disclosed in the drawings, in which—

Figure 1:
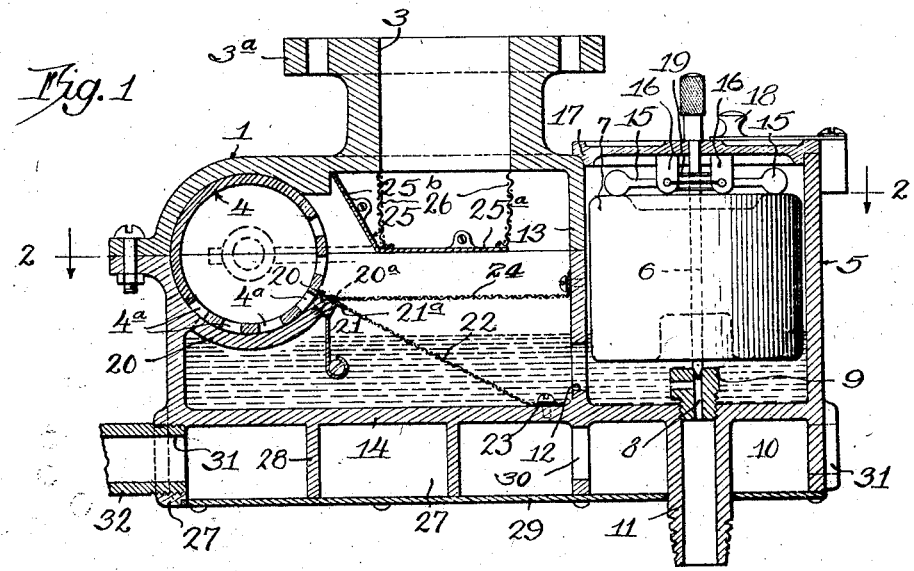
Fig. 1 is a view in vertical section through the device.
Figure 2:
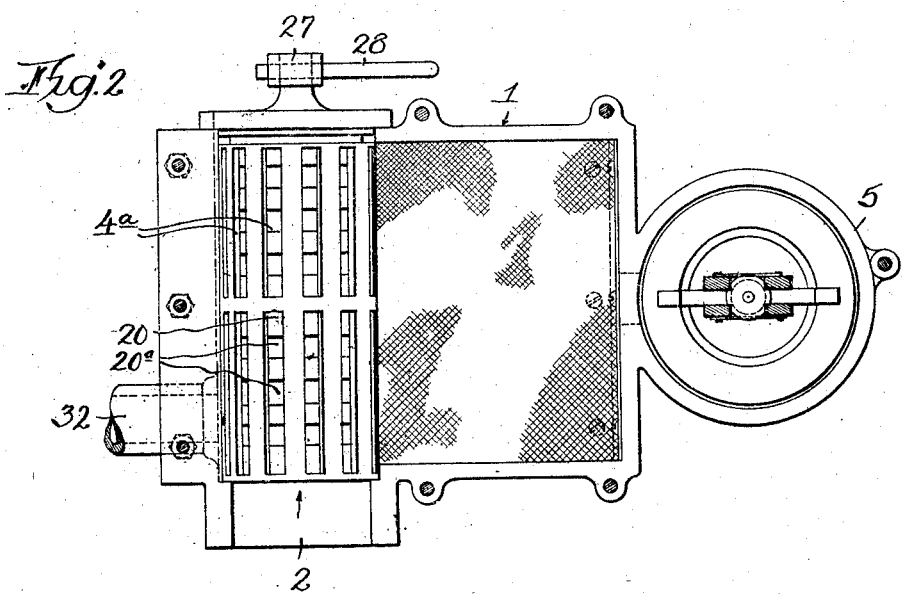
Fig. 2 is a view in horizontal section taken on line 2—2 of Fig. 1 with the air intake valve shown in bottom plan view.

In general the device consists of a rectangular casing 1 of a metallic construction, forming a closed chamber providing both a liquid reservoir and a mixing chamber, the latter communicating with the atmosphere through an intake opening 2 in its side wall and with the intake manifold of a motor, through a discharge opening or connection 3 in its top wall, said discharge connection being provided with the usual flange $3^a$, whereby the entire device is suspended from the intake manifold and direct communication is established between said manifold to the mixing chamber of the carburetor. Intermediate the intake opening of the carburetor 2 and the mixing chamber is a cylindric valve member 4 rotative about a horizontal axis and provided with a plurality of longitudinally extending slots $4^a$, through which the air is admitted into the interior of the casing.

The function of the valve 4 and its slots or openings $4^a$ will hereinafter be pointed out more in detail.

Associated with the casing 1 and preferably formed integral therewith is a cylindric casing 5, forming a float chamber, of the type commonly used in carburetor construction. A needle valve 6, operative by means of a float 7 controls the admission of liquid fuel through an inlet passage 8, formed in a valve block 9 mounted in the bottom wall 10 of the casing and communicating with a fuel connection 11, adapted to communicate with a source of fuel supply through a suitable pipe or hose connection. The interior of the float chamber communicates with the interior of the casing 1, through an aperture 12 formed in a vertical wall 13, separating the two chambers, said aperture 12 being located adjacent the bottom walls of said chambers which in reality form a continuous wall including the wall 10, already referred to and the wall 14 immediately beneath the mixing chamber of the casing 1.

The parts contained within the float chamber are arranged in accordance to the general practice, the float 7 being a hollow cylindric shell, adapted to float in the liquid fuel to a predetermined depth, and provided with a central passageway through which the valve stem 6 extends. The float 7 acts upon the valve stem 6 through the medium of lever arm 15—15, pivoted intermediate their ends between arms 16—16, depending from the underside of a cover plate 17, extending over the top of the float chamber and normally held in closed position by means of a resilient spring arm 18. The inner ends of the lever arms 14—14 are secured to the valve stem 6 through the medium of a collar 14 whereas the outer ends thereof are enlarged and rest upon the top surface of the float 7. In this manner the admission of the liquid fuel through the inlet passage 8 is automatically controlled by the level of the liquid within the float chamber, it being observed that as the level of the liquid rises the float will also rise, actuating the lever arms 14 in such a manner as to move the valve stem downwardly and close the inlet passage 8 at the point where said valve stem is seated. This method of automatic fuel control being common to carburetors in general, forms no part of the present invention.

Communication being established between the float chamber and the interior of the casing 1, through the aperture 12, so that the liquid normally stands at the same level in both chambers, this level being such that the liquid occupies substantially one-third the height of the mixing chamber. Extending transversely of the mixing chamber, immediately above the level of the liquid therein and in contact with the under surface of the cylindric valve 4 is a curved valve seat 20 to which a downwardly extending flange or baffle plate 21 is secured, said plate extending downwardly into the liquid, substantially one-half the depth thereof and serving in a degree to divide the reservoir into two parts, one part being directly beneath the valve 4 and the other part beneath the remaining open space of the chamber which constitutes the mixing chamber. Extending diagonally from the transverse bar 20 in a general direction downwardly and toward the float chamber is a wire screen of relatively fine mesh 22, lying in a plane disposed radially with respect to the axis of the valve 4 and inclined at an angle of substantially 30° to the level of the liquid, a portion of said screen being immersed in the liquid. The upper and lower margins of the screen are fixed in any suitable manner, although the upper margin is preferably secured to a flange 21$^a$ at the upper edge of the baffle plate 21 and along its lower edge to the bottom wall 13 of the casing 1 by means of screws 23. Extending horizontally from the valve seat 20 to the vertical wall 13 separating the float wall from the vertical chamber is another screen 24 also constructed of fine copper wire mesh, and located a short distance above the normal level of the fuel and completely separating the portions of the mixing chamber on either side thereof. Spaced above the screen 24 is a baffle plate 25 consisting of a horizontal portion 25$^a$, extending parallel to the screen 24, and terminating at its free end a short distance from the vertical wall 13, thereby forming a circuitous passage connecting the spaces on either side of the baffle plate. The horizontal portion 25$^a$ of the baffle plate 25 joins an oblique portion 25$^b$ extending from a point adjacent the valve member 4 upwardly in contact with the top wall of the casing 1. This baffle plate serves to form a restricted air passage above the screen 24. In addition to the screens 22 and 24, already mentioned, two vertical screens 26 are also provided, the same extending upwardly from the horizontal portion 25$^a$ of the baffle plate 25 to the upper wall of the outer casing and on either side of the outlet passage 3. These screens 26 are also of a fine copper wire mesh and surround the passage to the interior of the casing, and prevent the flame in the event of backfiring to reach the liquid through the valve 4 or to escape through the intake passage 2.

The air valve 4 has hereinbefore been described as a cylindric shell, having the longitudinal slots 4$^a$ formed throughout one-half of the circumference thereof, these slots being exposed to the interior of the casing, whereas the other half of the circumference bears against a semicircular seat formed to receive the valve. The valve is mounted within its seat 20 and other suitable bearings so that it may be rotated, and for this purpose it is provided with a stub shaft 27 to which is connected a short handle 28 whereby the valve may be rotatively adjusted. In the position shown in Fig. 1, the slots 4$^a$ open laterally and downwardly, communication between the interior of the valve and the interior of the mixing chamber being confined to a series of transverse slots 20$^a$ formed in the valve seat and extending at right angles to the slots 4$^a$ of the valve 4. Assuming that the interior of the mixing chamber is subjected to suction produced by the operation of the motor, it is manifest that air will be drawn into the interior of the valve 4 through the intake opening 2 and from thence outwardly through the slots 4$^a$ and 20$^a$, a portion of the air being drawn downwardly through the liquid beneath the baffle plate 21, thence upwardly through the screen 22 and the screen 24, into the space immediately above the latter. Another portion of the air passes directly and in a lateral direction through the slots 4$^a$, along the passage formed between the baffle plate 25 and the screen 24, and finally upwardly around the end of the baffle plate 25. That portion of the air which is carried through the body of the liquid is manifestly broken up into minutely small bubbles as it passes through the screen 22, uniting with the liquid to form a very rich mixture, which is immediately thereafter passed through the upper screen 24, to be further divided into a finer state, readily picked up and vaporized by the current of air issuing from the upper portion of the valve, and passing lengthwise of the passage formed between the screen 24 and the baffle plate 25.

In order to render the liquid fuel more volatile and more readily vaporized, provision is made for preheating the fuel by the formation of a chamber immediately beneath the bottom wall of the casing. This chamber is preferably formed by extending the outer walls of the casing and float chamber downwardly, thereby providing flanges 27. In addition, transverse flanges 28 depend from the bottom wall. Extending parallel with each other and spaced apart throughout the length of the bottom wall to the bottom of the flanges, is applied a plate 29, thus enclosing the space between the flanges forming a water tight compartment. The several spaces formed between the flanges are connected by openings such as 30, preferably located at various points, so that the heating medium, whether it be water or air, follows a circuitous path in its passage through the chamber. Openings 31—31 are provided at opposite ends of the casing, into which are fitted pipes such as 32, whereby the water of the cooling system may be circulated through the chamber. However, the exhaust gases or air heated by the motor may be employed as the heating agent.

In setting forth the mode of operation of the carburetor it is understood at the outset that the propelling force is the suction created by the motor, which draws a fresh charge of mixture during the suction stroke of each cylinder. Clearly the rapidity of the suction impulses are increased as the motor speed is increased, and the volume of the mixture drawn from the carburetor is correspondingly increased. However the richness of the mixture does not increase directly, but inversely, by reason of the fact that the air passed through the liquid at a greater speed, and its capacity to absorb the fuel is proportionately decreased. Thus it will be seen that the ideal conditions are obtained, namely a decreasing richness of mixture, with increasing motor speeds.

Having described a preferred embodiment of the invention, we claim:—

1. In a carburetor, the combination of a casing, having a mixture discharge opening, means for maintaining a constant level of liquid in said casing, an air intake valve comprising a hollow cylindric valve member extending horizontally of said casing above the liquid level and provided with ports, and means associated with said valve member to direct a part or all of the air through the liquid.

2. In a carburetor, the combination of a casing, means for maintaining a constant level of liquid in said casing, the space above the liquid forming a mixing chamber, having a discharge opening, an air intake valve comprising a hollow cylindric valve member rotatively mounted in a seat extending horizontally of said mixing chamber, and means whereby a part of the air may be directed through the liquid to said mixing chamber.

3. In a carburetor, the combination of a casing, means for maintaining a constant level of liquid in said casing, the space above the liquid forming a mixing chamber having a mixture discharge opening and an air intake opening, a valve for controlling the air intake, comprising a hollow cylindric valve member extending horizontally of said mixing chamber and rotative in a valve seat formed therein, and having ports adapted to register with ports in said valve member, and a wall extending from said valve below the level of the liquid, and sealing the space below said valve member from said mixing chamber.

4. In a carburetor, the combination of a casing, means for maintaining a constant level of liquid in said casing, the space above the liquid forming a mixing chamber, air intake and discharge openings communicating with said mixing chamber, an air intake valve comprising a hollow cylindric valve rotatively mounted in a valve seat extending horizontally of said casing above the liquid level and having ports therein, and a vertical baffle sealing a space below said valve from said mixing chamber.

5. In a carburetor, the combination of a casing, means for maintaining a constant level of liquid in said casing, the space above the liquid forming a mixing chamber, air intake and discharge openings communicating with said mixing chamber, an air intake valve comprising a cylindric sleeve rotatively mounted in a valve seat extending horizontally of said casing above the level of the liquid, said sleeve having circumferentially disposed ports, a baffle wall depending from said valve member below the level of the liquid, and sealing a portion of the surface of said valve from direct communication with said mixing chamber, and a screen located in the liquid beyond said baffle and in the path of the air through the liquid.

6. In a carburetor, the combination of a casing, means for maintaining a constant level of liquid in said casing, the space above the liquid forming a mixing chamber, air intake and discharge openings communicating with said mixing chamber, an air intake valve comprising a cylindric sleeve rotatively mounted in a valve seat extending horizontally of said casing above the level of the liquid, said sleeve having circumferentially disposed ports, a baffle wall depending from said valve member below the level of the liquid and sealing a portion of the surface of said valve from direct communication with said mixing chamber, and a screen located in the liquid beyond said baffle and in the path of the air through the liquid, and a screen located above the level of the liquid through which the gas passes before it is mixed with the air from the upper port or ports of the said air intake valve.

7. In a carburetor, the combination of a casing, means for maintaining a constant level of liquid in said casing, the space above the liquid forming a mixing chamber, air intake and discharge openings communicating with said mixing chamber, an air intake valve comprising a cylindric sleeve rotatively mounted in a valve seat extending horizontally of said casing above the level of the liquid, said sleeve having circumferentially disposed ports, a baffle wall depending from said valve member below the level of the liquid and sealing a portion of the surface of said valve from direct communication with said mixing chamber, and a screen located in the liquid beyond said baffle and in the path of the air through the liquid, the said screen having a series of ports smaller than the ports in said valve, located in the path of the air through the liquid.

8. In a carburetor, the combination of a casing, means for maintaining a constant level of liquid in said casing, the space above the liquid forming a mixing chamber, air intake and discharge openings communicating with said mixing chamber, an air intake valve comprising a cylindric sleeve rotatively mounted in a valve seat extending horizontally of said casing above the level of the liquid, said sleeve having circumferentially disposed ports, a baffle wall depending from said valve member below the level of the liquid, and sealing a portion of the surface of said valve from direct communication with said mixing chamber, a screen located in the liquid beyond said baffle and in the path of the air through the liquid, and a series of ports smaller than the ports in said valve located in the path of the air through the liquid, a series of ports larger than the ports in a series of ports in the liquid, which are located between the liquid and the discharge opening.

In witness whereof, we hereunto subscribe our names this 29th day of November, A. D. 1921.

GABRIEL P. B. HOYT.
DAVID B. CARSE.